United States Patent
Hampson et al.

(10) Patent No.: US 10,597,516 B2
(45) Date of Patent: Mar. 24, 2020

(54) METHOD OF MANUFACTURING COMPOSITE PRODUCTS COMPRISING A CARBOHYDRATE-BASED BINDER

(71) Applicant: KNAUF INSULATION SPRL, Visé (BE)

(72) Inventors: Carl Hampson, St. Helens (GB); Mike Maxwell, St. Helens (GB)

(*) Notice: Subject to any disclaimer, the term of this patent is extended or adjusted under 35 U.S.C. 154(b) by 0 days.

(21) Appl. No.: 16/306,557

(22) PCT Filed: May 23, 2017

(86) PCT No.: PCT/EP2017/062430
§ 371 (c)(1),
(2) Date: Dec. 1, 2018

(87) PCT Pub. No.: WO2017/207355
PCT Pub. Date: Dec. 7, 2017

(65) Prior Publication Data
US 2019/0127553 A1    May 2, 2019

(30) Foreign Application Priority Data

Jun. 2, 2016  (GB) .................................. 1609616.6

(51) Int. Cl.
| | | |
|---|---|---|
| *C08K 5/17* | (2006.01) | |
| *C08J 5/24* | (2006.01) | |
| *C08K 5/16* | (2006.01) | |
| *C08K 5/09* | (2006.01) | |
| *C08J 5/04* | (2006.01) | |
| *B05D 3/02* | (2006.01) | |
| *B05D 3/00* | (2006.01) | |
| *B05D 3/12* | (2006.01) | |

(52) U.S. Cl.
CPC .............. *C08K 5/17* (2013.01); *B05D 3/007* (2013.01); *B05D 3/0254* (2013.01); *B05D 3/12* (2013.01); *C08J 5/04* (2013.01); *C08J 5/24* (2013.01); *C08K 5/09* (2013.01); *C08K 5/16* (2013.01); *C08J 2301/00* (2013.01); *C08J 2303/02* (2013.01); *C08J 2305/00* (2013.01)

(58) Field of Classification Search
CPC ..... C08L 1/00; C08L 3/02; C08L 5/00; C08K 5/16; C08K 5/17; C08K 5/09; C08J 5/04; C08J 5/24; C08J 2301/00; C08J 2303/02; C08J 2305/00; B05D 3/007; B05D 3/0254; B05D 3/12
See application file for complete search history.

(56) References Cited

U.S. PATENT DOCUMENTS

| | | |
|---|---|---|
| 3,513,001 A | 5/1970 | Worthington et al. |
| 2011/0060095 A1 | 3/2011 | Tutin et al. |
| 2011/0086567 A1 | 4/2011 | Hawkins et al. |
| 2013/0133548 A1 | 5/2013 | Shooshtari et al. |
| 2014/0088225 A1* | 3/2014 | Swift .................. C08J 5/04 524/58 |
| 2015/0053114 A1 | 2/2015 | Hampson et al. |
| 2015/0232645 A1 | 8/2015 | Alavi |
| 2016/0002385 A1 | 1/2016 | Alavi |

FOREIGN PATENT DOCUMENTS

| | | |
|---|---|---|
| EP | 2963169 A1 | 1/2016 |
| GB | 2451719 A1 | 2/2009 |
| WO | 2013030390 A1 | 3/2013 |
| WO | 2014027115 A1 | 2/2014 |
| WO | 2016009062 A1 | 1/2016 |

OTHER PUBLICATIONS

Hoydonckx, H. E., Van Rhijn, W. M., Van Rhijn, W., De Vos, D.E. and Jacobs, P.A.: "Furfural and Derivatives", Ullmann's encyclopedia of industrial chemistry, Apr. 15, 2007 (Apr. 15, 2007), pp. 1-30, XP002449065, the whole document.

* cited by examiner

*Primary Examiner* — William P Fletcher, III
(74) *Attorney, Agent, or Firm* — Knauf Insulation, Inc.; James K. Blodgett; Brandon N. Hudder

(57) ABSTRACT

A method of using an amine compound including at least one amine functional group, wherein the amine functional group(s) comprise primary and/or secondary amine functional groups, to reduce the level of furfural and/or hydroxymethylfurfural in a carbohydrate-based binder or binder composition and/or escaping in the course of preparation, cross-linking and/or curing of carbohydrate-based binders, is provided. The carbohydrate-based binder is obtained from a carbohydrate-based binder composition comprising a carbohydrate component, a cross-linker and optionally one or more reaction products of the carbohydrate component and the cross-linker, wherein the cross-linker is selected from the group consisting of ammonium salts of inorganic acid, carboxylic acids, salts, ester and anhydride derivatives thereof, and combinations thereof.

18 Claims, 1 Drawing Sheet

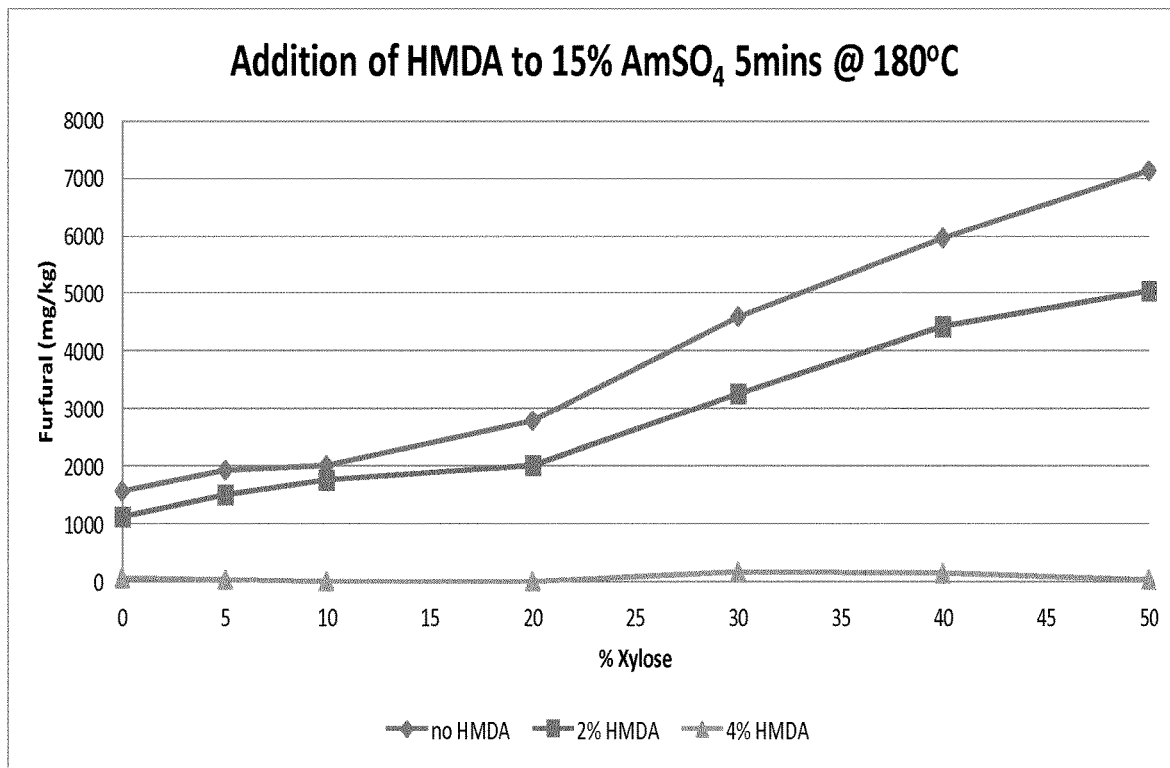

METHOD OF MANUFACTURING COMPOSITE PRODUCTS COMPRISING A CARBOHYDRATE-BASED BINDER

CROSS-REFERENCE TO RELATED APPLICATIONS

This application is a U.S. national counterpart application of International Application Serial No. PCT/EP2017/062430, filed May 23, 2017, under 35 U.S.C. § 371, which claims priority to GB Application Serial No. 1609616.6, filed Jun. 2, 2016, the disclosures of which are hereby incorporated herein by reference.

FIELD OF THE INVENTION

The present invention relates to a method of manufacturing composite products, more specifically composite products comprising fibers, particles, chips, strips, and/or sheets bonded with a binder. Examples of such composite products include woven and non-woven fiber mats, such as mineral fiber mats, for example mineral wool mats (glass wool, rock wool), mineral fiber veils, prepregs, engineered wood products, such as wood boards, for example MDF (Medium Density Fiber Boards), particle boards, oriented strand boards (OSB), plywood etc.

BACKGROUND OF THE INVENTION

The trend to more sustainable and environmentally friendly products has directed the development of such composite products away from the use of formaldehyde based binders towards the use of formaldehyde-free binders. Among such formaldehyde-free binders, carbohydrate-based binders represent an important share.

In the context of this description, "formaldehyde-free" is understood to mean "comprising less than about 1 ppm formaldehyde based on the weight of the composition and not liberating substantial formaldehyde".

Carbohydrate based binders include binders obtained by the reaction of a carbohydrate with a nitrogenous compound, such as Maillard-type binders, by the reaction of a carbohydrate with an organic acid, and other binders obtained from starting materials that include a carbohydrate.

Carbohydrates are readily available in nature. Sources are animal derived products such as chitosan (derived from crustacean shells) and plant derived products, including but not limited to starch, syrup, molasses and cellulose. These carbohydrates also called polysaccharides are macromolecules made up by saccharide units. An advantageous source of carbohydrate raw materials can be found in recycled materials, such as recycled municipal solid waste, recycled paper and/or sugar cane bagasse, and/or wood. Depending on the source and/or on the hydrolysis process used to degrade the polysaccharides, different polysaccharides or polysaccharide compositions may be obtained. In certain applications, smaller molecules may be preferred, such as short chain polysaccharides, oligosaccharides or even saccharide units. Again, depending on the source and/or hydrolysis process conditions, different saccharides or saccharide mixtures may be obtained. While cellulose hydrolysis will generate essentially C6 sugars, preferably C-6 reducing sugars, e.g. dextrose, hemicellulose will generate a large fraction of C5 sugars, like xylose for instance.

In raw materials resulting from hydrolysis of higher molecular weight carbohydrates, the level of C5-sugars or five membered ring sugars has been found to vary from 5 to 70 wt. %, preferably from 10, from 15, from 20 or even from 25% by weight, and up to preferably 60 wt. %, 50 wt. %, 45 wt. % or 40 wt. %.

It is known that saccharides may give rise to furfural and/or hydroxymethylfurfural formation in the course of the binder preparation and/or binder curing process. While starting from raw materials as discussed above to produce a binder may be of interest for several reasons, such as the availability of raw materials and costs of the manufacturing process, it has been found that the presence of C-5 sugars in the carbohydrate component gives rise to increased furfural and/or hydroxymethylfurfural generation in the course of the binder preparation and/or curing process. Furfural and/or hydroxymethylfurfural may be undesirable beyond a certain level, for environmental and/or health reasons, but also because of regulatory requirements. There is thus a need to reduce the level of furfural and/or hydroxymethylfurfural generated in the course of binder preparation and/or curing.

SUMMARY OF THE INVENTION

It has now been found that the level of furfural and/or hydroxymethylfurfural in the binder composition and/or escaping during binder preparation and/or curing may be reduced by addition of an amine compound, preferably an amine compound comprising at least one, preferably at least two amine functions, wherein the amine functions are primary or secondary amines.

The present invention hence provides a method for the preparation of a composite product comprising fibers and/or particles and/or sheet material bonded with a carbohydrate-based binder comprising (i) providing a binder composition comprising a carbohydrate component and a cross-linker and possibly reaction product of carbohydrate component and cross-linker, wherein the cross-linker is selected from ammonium salts of inorganic acid, carboxylic acids, salts, for example ammonium salts thereof, ester or anhydride derivatives thereof, and/or combinations thereof, (ii) adding to the binder composition an additional amount of from 0.5 to 10 wt. %, preferably 1 to 6 wt. % (based on the total dry weight of the binder composition) of an amine compound comprising at least one, preferably at least two amine functions, wherein the amine functions are primary or secondary amines, (iii) applying the composition obtained under (ii) onto the fibers, particles and/or sheet material, and (iv) subjecting the product obtained under (iii) to heat and possibly pressure to effect drying and/or curing.

BRIEF DESCRIPTION OF THE DRAWINGS

FIG. 1 is a chart showing the variation of furfural content in a binder derived from a carbohydrate component comprising dextrose and xylose in varying amounts, cross-linked with ammonium sulphate, as well as the effect of added hexamethylenediamine.

DETAILED DESCRIPTION OF THE INVENTION

As used herein, "ammonium" means $NH_4^+$.

The term "binder composition" as used herein means all ingredients applied to the matter to be bound and/or present on the matter to be bound, notably prior to curing, (other than the matter and any moisture contained within the matter) including reactants, solvents (including water), any carbohydrate component, any crosslinker and any additives.

The term "binder" is used herein to designate a thermoset binder resin obtained from the "binder composition".

The term "cured" means that the components of the binder composition have been subjected to conditions that lead to chemical change, such as covalent bonding, hydrogen bonding and chemical crosslinking, which may increase the cured product's durability and solvent resistance, and result in thermoset material.

The term "dry weight of the binder composition" as used herein means the weight of all components of the binder composition other than any water that is present (whether in the form of liquid water or in the form of water of crystallization).

The term "crosslinker" as used herein comprises compounds that are capable of reacting with the carbohydrate component to form ramifications or reticulations of the said carbohydrate component. As is understood, the cross-linker is different from and does not comprise any amine compound as defined above.

Carbohydrates as used herein comprise monosaccharides, disaccharides, oligosaccharides and polysaccharides and/or combinations thereof. They may be reducing sugars, such as dextrose, or non-reducing sugars, such as sucrose, that may produce reducing sugars in situ. They may advantageously be a low MW polysaccharide. In one embodiment, the carbohydrate component may be selected from or derived from molasses, starch, starch hydrolysates, dextrines and derivatives, cellulose hydrolysates, hemicellulose hydrolysates or mixtures thereof. As mentioned before, the carbohydrate component may be obtained from animal derived material and/or plant derived material. In a preferred embodiment, the carbohydrate component is derived from higher molecular weight carbohydrates, wherein the level of C5-sugars or five membered ring sugars varies from 10 to 70 wt. %, preferably from 15, from 20 or even from 25% by weight, and up to preferably 60 wt. %, 50 wt. %, 45 wt. % or 40 wt. %.

Suitable amine compounds comprise at least one, preferably at least two amine functions, wherein the amine functions are primary or secondary amines, the amine compound comprising preferably at least one primary amine function. The amine compound is advantageously selected from aliphatic monoamines, wherein the aliphatic group is a straight or branched saturated or unsaturated alkyl or hetero-alkyl chain having 2 to 24 C-atoms or cycloalkyl or cycloheteroalkyl or an aromatic carbon ring structure, each possibly substituted by hydroxy, carboxyl, halo, cyanate, sulfonyl or thiol, from compounds of general formula $H_2N-Q-NH_2$ wherein Q is a straight or branched alkanediyl, heteroalkanediyl having 2 to 24 C-atoms, cycloalkanediyl, or cylcoheteroalkanediyl, an aromatic carbon ring structure, possibly substituted by hydroxy, carboxyl, halo, cyanate, sulfonyl and/or thiol, or from proteins, such as whey or soy protein, possibly modified or denatured, or from poly(primary amines) having a molecular weight of 5000 or less and 10 wt. % or more of primary amine groups based on the weight of the polyamine. According to a preferred embodiment, Q is a $C_6$ alkanediyl. According to another embodiment, Q may be a cyclohexanediyl, cyclopentanediyl or cyclobutanediyl, or a divalent benzyl radical. In this context, it should be noted that certain authors prefer using the term "alkyl" instead of the chemically more correct "alkanediyl" nomenclature; the same chemical group is meant. As used herein, the term "alkanediyl" means a chain of carbon atoms, which may optionally be branched, preferably of limited length, including —$C_1$-$C_{24}$—, —$C_1$-$C_{12}$—, —$C_1$-$C_8$—, —$C_1$-$C_6$—, and —$C_1$-$C_4$-. Shorter alkanediyl groups may add less lipophilicity to the compound and accordingly will have different reactivity towards the reducing sugar reactant and/or solubility. As used herein, the term "cycloalkanediyl" means a chain of carbon atoms, which may optionally be branched, where at least a portion of the chain is cyclic and also includes polycyclic structures, for example, cyclopropanediyl, cyclopentanediyl, cyclohexanediyl, 2-methylcyclopropanediyl, 2-ethylcyclopentanediyl, adamantanediyl. Furthermore, the chain forming cycloalkanediyl is advantageously of limited length, including —$C_3$-$C_{24}$—, —$C_3$-$C_{12}$—, —$C_3$-$C_8$—, —$C_3$-$C_6$—, and —$C_5$-$C_6$—. Shorter alkanediyl chains forming cycloalkanediyl may add less lipophilicity to the compound and accordingly will have a different behaviour.

The poly(primary amine) may be selected from polyetheramines, polyethyleneimines, polyethyleneimine containing copolymers and block copolymers, polyvinyl amines, (co)polymers of n-aminoalkyl (meth)acrylates, such as aminoethyl methacrylate.

In illustrative embodiments, the polyamine is selected from a group consisting of a diamine, triamine, tetraamine, and pentamine. In one embodiment, the polyamine is a diamine selected from a group consisting of 1,6-diaminohexane and 1,5-diamino-2-methylpentane. In one embodiment, the diamine is 1,6-diaminohexane. In one embodiment, the polyamine is a triamine selected from a group consisting of diethylenetriamine, 1-piperazineethaneamine, and bis(hexamethylene)triamine. In another embodiment, the polyamine is a tetramine such as triethylenetetramine. In another embodiment, the polyamine is a pentamine, such as tetraethylenepentamine.

The relevant amine compound may also be selected from aminoacids. Some are primary monoamines; others are di-primary amines. Lysine is an example of a diamine which has shown to perform well and which is readily available for applications under consideration.

Another amine compound family that has shown to perform well are urea based compounds, more particularly urea. Urea comprises two —$NH_2$ groups which are available for reaction.

As used herein the term "carboxylic acid" includes monocarboxylic acids as well as polycarboxylic acids, salts, ester and anhydride derivatives thereof. The term "polycarboxylic acid" indicates a dicarboxylic, tricarboxylic, tetracarboxylic, pentacarboxylic, and monomeric polycarboxylic acids, as well as polymeric polycarboxylic acids, and combinations thereof. In one aspect, the polycarboxylic acid ammonium salt reactant is sufficiently non-volatile to maximize its ability to remain available for reaction with the carbohydrate reactant of a Maillard reaction (discussed below). In another aspect, the polycarboxylic acid ammonium salt reactant may be substituted with other chemical functional groups. Monomeric polycarboxylic acid comprises dicarboxylic acid, including, but not limited to, unsaturated aliphatic dicarboxylic acids, saturated aliphatic dicarboxylic acids, aromatic dicarboxylic acids, unsaturated cyclic dicarboxylic acids, saturated cyclic dicarboxylic acids, hydroxy-substituted derivatives thereof, and the like. Polycarboxylic acid(s) may be a tricarboxylic acid, including, but not limited to, unsaturated aliphatic tricarboxylic acids, saturated aliphatic tricarboxylic acids, aromatic tricarboxylic acids, unsaturated cyclic tricarboxylic acids, saturated cyclic tricarboxylic acids, hydroxy-substituted derivatives thereof, and the like. It is appreciated that any such polycarboxylic acids may be optionally substituted, such as with hydroxy, halo, alkyl, alkoxy, and the like. In one variation, the polycarboxylic acid is the saturated aliphatic tricarboxylic acid, citric acid.

Other suitable polycarboxylic acids are contemplated to include, but are not limited to, aconitic acid, adipic acid, azelaic acid, butane tetracarboxylic acid dihydride, butane tricarboxylic acid, chlorendic acid, citraconic acid, dicyclopentadiene-maleic acid adducts, diethylenetriamine pentaacetic acid, adducts of dipentene and maleic acid, ethylenediamine tetraacetic acid (EDTA), fully maleated rosin, maleated tall-oil fatty acids, fumaric acid, glutaric acid, isophthalic acid, itaconic acid, maleated rosin oxidized with potassium peroxide to alcohol then carboxylic acid, maleic acid, malic acid, mesaconic acid, biphenol A or bisphenol F reacted via the KOLBE-Schmidt reaction with carbon dioxide to introduce 3-4 carboxyl groups, oxalic acid, phthalic acid, sebacic acid, succinic acid, tartaric acid, terephthalic acid, tetrabromophthalic acid, tetrachlorophthalic acid, tetrahydrophthalic acid, trimellitic acid, trimesic acid, and the like, and anhydrides, and combinations thereof.

Illustratively, a polymeric polycarboxylic acid may be an acid, for example, polyacrylic acid, polymethacrylic acid, polymaleic acid, and like polymeric polycarboxylic acids, copolymers thereof, anhydrides thereof, and mixtures thereof. Examples of commercially available polyacrylic acids include AQUASET-529 (Rohm & Haas, Philadelphia, Pa., USA), CRITERION 2000 (Kemira, Helsinki, Finland, Europe), NF1 (H. B. Fuller, St. Paul, Minn., USA), and SOKALAN (BASF, Ludwigshafen, Germany, Europe). With respect to SOKALAN, this is a water-soluble polyacrylic copolymer of acrylic acid and maleic acid, having a molecular weight of approximately 4000. AQUASET-529 is a composition containing polyacrylic acid cross-linked with glycerol, also containing sodium hypophosphite as a catalyst. CRITERION 2000 is an acidic solution of a partial salt of polyacrylic acid, having a molecular weight of approximately 2000. With respect to NF1, this is a copolymer containing carboxylic acid functionality and hydroxy functionality, as well as units with neither functionality; NF1 also contains chain transfer agents, such as sodium hypophosphite or organophosphate catalysts.

Further, compositions including polymeric polycarboxylic acids are also contemplated to be useful in preparing the binders described herein, such as those compositions described in U.S. Pat. Nos. 5,318,990, 5,661,213, 6,136,916, and 6,331,350, the disclosures of which are hereby incorporated herein by reference. In particular, in U.S. Pat. Nos. 5,318,990 and 6,331,350, an aqueous solution of a polymeric polycarboxylic acid, a polyol, and a catalyst is described. As described in U.S. Pat. Nos. 5,318,990 and 6,331,350, the polymeric polycarboxylic acid comprises an organic polymer or oligomer containing more than one pendant carboxy group. The polymeric polycarboxylic acid may be a homopolymer or copolymer prepared from unsaturated carboxylic acids including, but not necessarily limited to, acrylic acid, methacrylic acid, crotonic acid, isocrotonic acid, maleic acid, cinnamic acid, 2-methylmaleic acid, itaconic acid, 2-methylitaconic acid, α,β-methyleneglutaric acid, and the like. Alternatively, the polymeric polycarboxylic acid may be prepared from unsaturated anhydrides including, but not necessarily limited to, maleic anhydride, itaconic anhydride, acrylic anhydride, methacrylic anhydride, and the like, as well as mixtures thereof. Methods for polymerizing these acids and anhydrides are well-known in the chemical art. The polymeric polycarboxylic acid may additionally comprise a copolymer of one or more of the aforementioned unsaturated carboxylic acids or anhydrides and one or more vinyl compounds including, but not necessarily limited to, styrene, α-methylstyrene, acrylonitrile, methacrylonitrile, methyl acrylate, ethyl acrylate, n-butyl acrylate, isobutyl acrylate, methyl methacrylate, n-butyl methacrylate, isobutyl methacrylate, glycidyl methacrylate, vinyl methyl ether, vinyl acetate, and the like. Methods for preparing these copolymers are well-known in the art. The polymeric polycarboxylic acids may comprise homopolymers and copolymers of polyacrylic acid. The molecular weight of the polymeric polycarboxylic acid, and in particular polyacrylic acid polymer, may be less than 10000, less than 5000, or about 3000 or less. For example, the molecular weight may be 2000.

Preferred cross-linkers are selected from ammonium salts of inorganic acids, such as ammonium sulphate or ammonium phosphate, and ammonium salts of carboxylic acids. Further suitable cross-linkers are salt, ester and anhydride derivatives of carboxylic acids, preferably polycarboxylic acids, more preferably monomeric polycarboxylic acids.

In a further aspect, the present invention relates to a composite material obtained by the method of the invention, the said composite material comprising a reduced furfural and/or hydroxymethylfurfural content as compared with a composite material obtained from the same raw material transformed under the same processing conditions but with no added amine compound comprising at least one, preferably at least two amine functions, wherein the amine functions are primary or secondary amines.

The binder composition may be used in the manufacturing of composite products, such as wood boards, for example wood particle boards, medium density fibreboard (MDF), chip boards or orientated strand board (OSB), and plywood. The binder may be used to bond abrasive particles together and/or onto a backing sheet or to bond fibers, such as woven and non-woven natural, synthetic, textile or mineral fibers, for instance glass fibers or mineral wool fibers. Such bonded mineral fibers, for instance mineral glass wool or stone wool fibers, may be used in the manufacturing of thermal and/or acoustic insulating materials.

A wood particle board is a composite material manufactured from wood particles, for example wood chips, sawmill shavings and/or saw dust at varying particle sizes held together by a binder and used especially for the manufacture of furniture, such as cabinets, kitchens and bathroom furniture. Generally, wood particle board (which is sometimes referred to as "chipboard") is produced by mixing wood particles and a binder composition, e.g. a thermo-curable resin, subsequently forming the resulting mixture into a sheet or mat and compressing said sheet or mat under elevated temperatures.

Plywood is a composite sheet material manufactured from thin layers of wood glued together by a binder, adjacent wood layers having their wood grain rotated by approx. 90 degrees to one another.

When used as a binder in wood boards, such as plywood, particle boards, fiber boards, the solid content of the aqueous binder composition may range from 50 to 95 w %, preferably 50 to 90 w %, more preferably 55 to 85 w % or even 60 to 80 w %, based upon the weight of the total aqueous binder composition.

The binder may also be used to bond synthetic or natural fibers, for instance mineral fibers, such as glass fibers, glass wool or stone wool. In view of the manufacture of a fiber mat, such as for insulating products, for instance, an aqueous binder composition is applied onto the fibers, e.g. by spraying, and the binder impregnated mineral fibers are deposited as a mat and subsequently subjected to heat for curing of the binder composition, hence forming an assembly of bonded fibers.

When used in the manufacture of a fiber based composite, the solid content of the invention aqueous binder composition may range from 5 to 95 w %, advantageously from 8 to 90 w %, preferably from 10 to 85 w %, based on the weight of the total aqueous binder composition. More specifically, when used as a binder for mineral wool insulation, the solid content of the aqueous binder composition may be in the range from 5 to 25 w %, preferably from 8 to 20 w %, more preferably from 10 to 20 w % or even 12 to 18 w %, based on the weight of the total aqueous binder composition.

In the binder composition, the carbohydrate component is advantageously present in an amount ranging from 30%, preferably from 40%, preferably from 50%, more preferably from 60%, more preferably from 70%, even more preferably from 80% by dry weight of the binder composition, to less than 97% more preferably less than 95% by dry weight of the binder composition.

The crosslinker may make up:
- less than 50% or 40%, preferably less than 30%, more preferably less than 25% by dry weight of the binder composition; and/or
- at least 2.5%, preferably at least 5%, more preferably at least 10% by dry weight of the binder composition.

The binder composition may comprise at least 25%, and preferably at least 40%, at least 50% or at least 60% by dry weight of: (a) carbohydrate component and crosslinker and/or (b) curable reaction product(s) of carbohydrate component and crosslinker.

The crosslinker and the carbohydrate component (or their reaction product(s)) may be Maillard reactants that react to form Maillard reaction products, notably melanoidins when cured. Curing of the binder composition may comprise or consist essentially of Maillard reaction(s). The cured binder is preferably a thermoset binder and is preferably substantially water insoluble.

The binder composition may further comprise one or more adjuvants, for example waxes, dyes, release agents, formaldehyde scavengers, hydrophobizing agents and other adjuvants commonly used in binder compositions. In certain applications, such as for example the bonding of mineral fibers, coupling agents, such as for example silicon-based coupling agents may advantageously be combined with the binder components in the binder composition. Also, catalysts, such as mineral phosphorous-based salts and/or acids, such as phosphate or hypophosphite salts, may be added into the binder composition as catalysts of the resin forming reaction.

Further advantages of the invention will become apparent from the Examples herein below.

FIG. 1 is a chart showing the variation of furfural content in a binder derived from a carbohydrate component comprising dextrose and xylose in varying amounts, cross-linked with ammonium sulphate, as well as the effect of added hexamethylenediamine.

EXAMPLE 1

Dextrose and varying amounts of xylose were dissolved in water to constitute different carbohydrate components. These carbohydrate components were combined with ammonium sulphate cross-linker (AMS) to form aqueous binder compositions at a dry weight ratio of carbohydrate/AMS of 85/15 and at 37.5 wt. % solids. The same procedure was repeated with binder compositions as above further comprising 2 and 4 wt. % hexamethylene diamine. GFA glass filters were impregnated with the relevant binders at a rate of 15% by weight cured solids, and cured during 5 min at 180° C.

The furfural concentration of the cured binder was determined by leaching the impregnated filter into a small quantity of water at room temperature for 1 hour and analysing the leachate for furfural and hydroxyfurfural by HPLC (C18 column, acetonitrile/water mobile phase, UV detector). The results were plotted in a chart as per FIG. 1 which clearly shows that addition of small amounts of hexamethylene diamine significantly depresses furfural generation.

EXAMPLE 2

The same experiment as above was repeated for the compositions shown in the Tables below, in comparison with corresponding compositions containing no amine.

As can be understood, added urea, lysine and some further polyamines efficiently reduce furfural concentration in the leachate.

TABLE 1

Furfural reduction in 85/15 glucose/$(NH_4)_2SO_4$ binder compositions

| Amine | % Reduction in Furfural + 2% amine | % Reduction in Furfural + 4% amine |
|---|---|---|
| HMDA | 8% | 95% |
| Lupasol FG | 9% | 48% |
| Urea | 36% | 47% |
| TETA Triethylenetetramine | 16% | 46% |
| Lysine | 7% | 22% |
| Luredur VM | 0% | 16% |
| Ethylamine | 0% | 0% |
| Jeffamine T-403 | 0% | 0% |

TABLE 2

Furfural reduction in 85/15 sugar/$(NH_4)_2SO_4$ binder compositions, wherein the sugar composition comprises 60% wt. glucose and 40% wt. xylose.

| Amine | % Reduction in Furfural + 2% amine | % Reduction in Furfural + 4% amine |
|---|---|---|
| HMDA | 27% | 98% |
| Lysine | 16% | 29% |
| TETA Triethylenetetramine | 15% | 26% |
| Lupasol FG | 6% | 23% |
| Urea | 12% | 22% |
| Jeffamine T-403 | 9% | 19% |
| Ethylamine | 2% | 18% |
| Luredur VM | 0% | 6% |

In the Tables above,
HMDA stands for hexamethylenediamine
Lupasol FG (commercial name) is a polyethylenimine
Jeffamine T-403 (commercial name) is a polyetheramine
Luredur VM (commercial name) is a polyvinylamine

What is claimed is:
1. A method for the preparation of a composite product comprising fibers and/or particles and/or sheet material bonded with a binder comprising (i) providing a binder composition comprising a carbohydrate component and a cross-linker comprising at least 10% and less than 50% by dry weight of the binder composition and, optionally, at least one reaction product of the carbohydrate component and the cross-linker, wherein the cross-linker is selected from the group consisting of ammonium salts of inorganic acid, carboxylic acids, ammonium salts thereof, ester and anhydride derivatives thereof, and combinations thereof, (ii) adding to the binder composition an additional amount of 0.5-10 wt. % based on the total dry weight of the binder composition of an amine compound comprising at least two amine functional groups selected from primary and secondary amines, and the amine compound is selected from (a) aliphatic monoamines, the aliphatic group being a straight or branched saturated or unsaturated alkyl or hetero-alkyl chain comprising 2-24 C-atoms or cycloalkyl or cycloheteroalkyl or an aromatic carbon ring structure, each optionally substituted by a hydroxy, carboxyl, halo, cyanate, sulfonyl or thiol functional groups, (b) compounds of the general formula $H_2N$-Q-$NH_2$, wherein Q is a straight or branched alkyl or heteroalkyl functional group comprising 2-24 C-atoms, cycloalkyl, or cylcoheteroalkyl, an aromatic carbon ring structure, optionally substituted by a hydroxy, carboxyl, halo, cyanate, sulfonyl and/or thiol functional group, (c) whey or soy protein, optionally modified or denatured, (d) polyprimary amines comprising a molecular weight of 5000 or less and 10 wt. % or more of primary amine groups based on the weight of the polyamine, (d) polyamino acids selected from lysine, ornithine, diaminobutyric acid and diaminopropionic acid, or (f) polyetheramines, polyethyleneimines, polyethyleneimine comprising copolymers and block copolymers, polyvinylamines, (co)polymers of aminoethyl methacrylate, (iii) applying the composition obtained under (ii) onto the fibers, particles and/or sheet material, and (iv) subjecting the product obtained under (iii) to heat and optionally pressure to effect drying and/or curing.

2. The method of claim 1, wherein the cross-linker is selected from ammonium sulfate and ammonium phosphate.

3. The method of claim 1, wherein the cross-linker is selected from the group consisting of a carboxylic acid, ammonium salts thereof, and ester or anhydride derivatives thereof.

4. The method of to claim 3, wherein the carboxylic acid comprises a polycarboxylic acid.

5. The method of claim 3, wherein the carboxylic acid comprises a monomeric polycarboxylic acid.

6. The method of claim 1, wherein the carbohydrate is selected from the group consisting of monosaccharides, disaccharides, oligosaccharides polysaccharides and combinations thereof.

7. The method of claim 6, wherein the carbohydrate comprises dextrose.

8. The method of claim 6, wherein the carbohydrate comprises non-reducing sugars capable of producing reducing sugars in situ.

9. The method of claim 1, wherein the carbohydrate component is a low molecular weight polysaccharide selected from the group consisting of molasses, starch, starch hydrolysates, dextrins and derivatives thereof, cellulose hydrolysates, hemicellulose hydrolysates mixtures thereof and derivatives thereof.

10. The method of claim 1, wherein the carbohydrate component is derived from higher molecular weight carbohydrates and comprises C5 sugars and/or five-membered ring sugar concentrations of 10-70 wt. %.

11. A method for reducing furfural and/or hydroxymethylfurfural concentrations in a binder composition or binder and/or escaping from binders during the preparation, cross-linking and/or curing thereof, comprising adding an amine compound comprising at least two amine functional groups selected from primary and secondary amines to the binder composition during binder preparation and prior to curing.

12. The method of claim 11, wherein the binder is obtained from a binder composition comprising a carbohydrate component and a cross-linker and, optionally, at least one reaction product of the carbohydrate component and the cross-linker, wherein the cross-linker is selected from the group consisting of ammonium salts of inorganic acid, carboxylic acids, ammonium salts thereof, ester and anhydride derivatives thereof, and combinations thereof.

13. The method of claim 12, wherein the carbohydrate component concentrations ranges from 60% to less than 95% by dry weight of the binder composition, and wherein the crosslinker concentration ranges from 5% to less than 40% by dry weight of the binder composition.

14. The method of claim 12, wherein the crosslinker comprises an amine compound at a concentration of 0.5-10 wt. %, based on the dry weight of the binder composition.

15. The method of claim 11, wherein the binder is obtained from a binder composition comprising a carbohydrate component and a cross-linker and, optionally, at least one reaction product of the carbohydrate component and the crosslinker, wherein the crosslinker is an ammonium salt of an inorganic acid selected from ammonium sulfate and ammonium phosphate.

16. The method of claim 11, wherein the binder is obtained from a binder composition comprising a carbohydrate component and a cross-linker and, optionally, at least one reaction product of the carbohydrate component and the cross-linker, wherein the cross-linker is selected from the group consisting of a polycarboxylic acid, ammonium salts thereof and ester and anhydride derivatives thereof.

17. The method of claim 11, wherein the carbohydrate is selected from the group consisting of monosaccharides, disaccharides, oligosaccharides polysaccharides and combinations thereof, wherein any non-reducing sugars that are present are capable of producing reducing sugars in situ, and wherein the concentration of C5 sugars or five-membered ring sugars ranges from 10-70 wt. %.

18. The method of claim 11, wherein the binder composition comprises a carbohydrate component and a cross-linker and, optionally, at least one reaction product of the carbohydrate component and the cross-linker, wherein the carbohydrate component concentration ranges from 30% to less than 95% by dry weight of the binder composition, and wherein the crosslinker concentration ranges from 5% to less than 50% by dry weight of the binder composition.

* * * * *

(12) SUPPLEMENTAL EXAMINATION CERTIFICATE

United States Patent
Hampson et al.

(10) Number: US 10,597,516 F1
(45) Certificate Issued: Apr. 1, 2024

Control No.: 96/050,032

Filing Date: Mar. 20, 2024

Primary Examiner: Jerry D Johnson

No substantial new question of patentability is raised in the request for supplemental examination. See the Reasons for Substantial New Question of Patentability Determination in the file of this proceeding.

(56) Items of Information

OTHER DOCUMENTS

Declaration for Carl Hampton dated Jan. 14, 2020.

Declaration for Mike Maxwell dated Jan. 14, 2020.

Supplemental Declaration of Carl Hampton dated October 17, 2023.

Supplemental Declaration of Mike Maxwell dated October 17, 2023.